United States Patent [19]

Bateman

[11] Patent Number: 5,780,093
[45] Date of Patent: *Jul. 14, 1998

[54] LOW-FAT SAUTE

[76] Inventor: Kristine Bateman, 243 W. Main, Rigby, Id. 83442

[*] Notice: The term of this patent shall not extend beyond the expiration date of Pat. No. 5,650,189.

[21] Appl. No.: 870,117

[22] Filed: Jun. 5, 1997

Related U.S. Application Data

[63] Continuation-in-part of Ser. No. 516,624, Aug. 18, 1995, Pat. No. 5,650,189, which is a continuation-in-part of Ser. No. 487,085, Jun. 7, 1995, abandoned, which is a continuation-in-part of Ser. No. 223,290, Apr. 5, 1994, abandoned, which is a continuation-in-part of Ser. No. 76,318, Jun. 11, 1993, abandoned.

[51] Int. Cl.$^6$ .................................................. A23L 1/0522
[52] U.S. Cl. ........................ 426/578; 426/581; 426/603; 426/661; 426/804
[58] Field of Search ................................ 426/578, 581, 426/603, 661, 804

[56] References Cited

U.S. PATENT DOCUMENTS 5,650,189  7/1997  Bateman .................... 426/578

*Primary Examiner*—Carolyn Paden
*Attorney, Agent, or Firm*—Hopkins Roden Crockett Hansen & Hoopes, PLLC

[57] ABSTRACT

A low-fat saute and method for making the same is disclosed, the mixture substantially simulating the appearance, taste, texture, and mouth feel of traditional fat-filled sautes.

21 Claims, No Drawings

LOW-FAT SAUTE

This application is a continuation-in-part from a previous application filed on Aug. 18, 1995, Ser. No. 08/516,624 entitled "Low-Fat Saute," now U.S. Pat. No. 5,650,189 which is a continuation-in-part from an application filed on Jun. 7, 1995, Ser. No. 08/487,085, entitled "Non-Fat Saute," now abandoned, which is a continuation-in-part from an application filed on Apr. 5, 1994, Ser. No. 08/223,290, now abandoned, which is a continuation-in-part from an application filed Jun. 11, 1993, Ser. No. 08/076,318, now abandoned.

BACKGROUND OF THE INVENTION

1. Field of the Invention

This invention is in the field of low-fat sautes, yet employs a low-fat saute which can be substituted in a one-to-one ratio for many different kinds of sautes, including margarines, butters, oils, and shortenings, rendering a substantially similar food product in terms of taste and texture as if a normal fat saute were used and relies on a single emulsifier, rather than selecting a different emulsifier for each saute substituted. In the various embodiments of this invention, where a recipe calls for a certain amount of saute, the same amount of the invention may be substituted on a one-to-one basis for the amount of saute called for in the recipe.

2. Description of Related Art

Sautes are used widely in cooking to soften, flavor, or otherwise enhance foods. Fat in sautes prevents sauteed products from sticking to the saute pan. Also, fat provides the saute and the sauteed product with a desired flavor, consistency and texture. While fat is a key element of a saute's structure, taste and texture, it contains many calories. There is a need for a saute medium that mimics fat, but actually contains little fat. Thus, the challenge facing a low-fat saute is to reduce fat calories while retaining structure, taste and texture.

High fat sauteing requires a small quantity of fat (such as butter, vegetable oil, olive oil, or margarine) to be added to an open pan. The fat must be hot enough that when vegetables or meats are added they are seared at once, preventing the loss of juices.

Prior art low-fat cooking recommends sauteing with water or broth, then covering the pan. However, instead of sauteing using this process, vegetables or meats are steamed. The vegetables or meats are not seared and lack the taste that the fat imparts.

The prior art discloses a number of attempts to lower the percentage of fat in edible products by replacing fat with carbohydrate-based products, including starches and maltodextrins, referred to collectively as saccharide polymers. Maltodextrins act as bulking agents, taking the place of many of the physical characteristics of fats, but containing as many as 5 fewer calories per gram of dry, edible product. Similarly, pregelatinized starches act as bulking agents.

Starches, including corn starch, potato starch, rice starch, and tapioca starch can be converted to water-soluble starches, including pregelatinized starches. These and other starches can also be converted to non-sweet nutritive saccharide polymers, including maltodextrins, through a process involving heat, gelatinization, hydrolysis, and additional refining. Maltodextrins are among the possible resulting partial hydrolyzates of various starches and have been defined by the U.S. Food and Drug Administration ("FDA") as non-sweet nutritive saccharide polymers that consist of D-glucose units linked primarily by alpha 1,4 bonds having a dextrose equivalence (DE) of less than 20. According to the FDA, maltodextrins are prepared as a dry powder "with safe and suitable acids and enzymes."

Dextrose equivalence reflects the amount of hydrolysis performed upon the starch and measures the amount of reducing sugar in each compound, 0 being the reducing sugar content of starch and 100 being the reduction power of dry glucose. As DE increases, freezing point depression, hygroscopicity, solubility, and osmolality increase, and molecular weight decreases. The lower the DE, the closer the maltodextrin is to starch. The higher the DE, the closer the maltodextrin is to corn syrup.

Starches can undergo physical changes, including pregelatinization, which increases the water solubility of the starch. Pregelatinized starches have no DE. Combining a maltodextrin with a starch decreases the dextrose equivalence of the overall product, decreases the product's stickiness and yields a full-bodied consistency. For example, a combination of rice maltodextrin DE-10 and potato modified starch pregelatinized, together which small amounts of whey protein and xanthum gum, is known in the art and has been commercially available for years. The combination has a DE equivalent of 3. Adding starch, however, tends to make the product more viscous. Finding a proper balance between starch and maltodextrin and finding the proper DE is difficult and requires experimentation and testing.

Since these characteristics define various sautes, the selection of the proper maltodextrin and/or starch is pivotal for the proper texture and consistency of saute. In prior art fat replacement systems, replacement of the fats in foods with mere maltodextrins provided an unsatisfactory texture. One explanation for the texture loss in low-fat or no-fat cakes lacking an emulsifier in addition to maltodextrin was the protein denaturation caused by maltodextrin. As a result, emulsifiers were combined with maltodextrins in an attempt to improve the fat replacer's textural qualities. However, the prior art failed to reveal a universal emulsifier which can be used in conjunction with maltodextrin as a fat replacement for various sautes.

The substitution on a one-to-one basis of maltodextrins and one type of emulsifier for the fat in a variety of sautes is desirable because the resulting low-fat saute can replace butter, margarine, shortening, oil, and other forms of fat in sautes with a single emulsifier. However, the prior art revealed no low-fat formula which used a single emulsifier together with the proper combination of saccharide polymers and water and which provided a universal textural quality such that it could be used on a one-to-one basis as a replacement for the different kinds of fat in various sautes.

SUMMARY OF THE INVENTION

An object of this invention is to provide the specific formula for a low-fat saute capable of replacing various sautes, yet producing a saute which has a rich buttery taste and substantially simulates the texture of full-fat sautes.

A further object of this invention is to create a saute which is shelf stable such that the fat replacement can be sold in bottles and substituted by home bakers and/or commercial manufacturers for full-fat sautes.

The applicant has discovered that a reduced amount of fat, in combination with maltodextrins and water, in the ranges disclosed herein, balances the goals of achieving textural and taste integrity in a low-fat saute.

While the applicant's invention may be made with maltodextrins derived from a variety of starches, including, for example, corn maltodextrin or rice maltodextrin, a combination of corn and rice maltodextrin is preferred.

Higher DE maltodextrins are more soluble and refined than granular acid modified starches and other lower DE starch hydrozylates. Granular starch derivatives and lower DE starch hydrozylates are not as soluble in cool water as higher DE starch hydrozylates.

Applicant's embodiments include maltodextrins having a DE of less then 20. Applicant's embodiments also include maltodextrins having a DE of 6 or more but less than 10, as well as maltodextrins having a DE of more than 10, but less than 20.

In order to receive the maximum textural quality, however, the preferred combination of saccharide polymers is one or more maltodextrin having a DE of 10. The most preferred combination comprises (1) corn maltodextrin DE-10 and (2) rice maltodextrin DE-10; and a pregelatinized starch. Possible pregelatinized starches include potato modified pregelatinized starch and a pregelatinized starch derived from corn, as well as many other pregelatinized starches. Other possible maltodextrins, although not preferred, may be employed as substitutes or in combination with the rice maltodextrin DE 10 and corn maltodextrin DE 10. Rice maltodextrin is not as sticky as corn maltodextrin and adds variety to the corn maltodextrin, enhancing texture.

The invention also includes an additional texture enhancer in the range of up to about 2 percent by weight, preferably whey protein, a water absorber and xanthum gum, a thickener. The preferred whey protein contains at least 50 percent protein by weight.

Since the present invention is designed for sautes, it is desirable to generate a product with a pleasing color and a long shelf life at room temperature. Yellow food coloring may be added to the saute to create the appearance of butter. Furthermore, the addition of a small amount of calcium propionate prevents the growth of mold while the addition of small amounts of sodium benzoate prevent the build up of yeast. To enhance shelf life, it is desirable to have a saute which has a pH of 4.5. Citric acid or an equivalent pH adjuster may be added until a pH of 4.5 is achieved. The resulting saute generally does not require refrigeration, but for shelf life over an extended period of time, such as six months, refrigeration is recommended.

A method for making the saute is also claimed, which can be performed at cool temperatures. In the present invention, fat is added at room temperature so that it will disperse quickly through the mixture.

The saute disclosed is ideal for use in a hot pan or skillet to saute vegetables, meats, main dishes and other food products which are normally sauteed. Cooking is preferably performed on an open non-stick pan, which is kept in motion by stirring and heating. The process is rapid. The food is preferably cut in small pieces so that it will cook quickly until tender. Because of the reduced fat, however, foods may have more of a tendency to stick to the pan or skillet. If this occurs, the problem can be overcome by placing the lid on the pan for a few seconds, after which the food product loosens up.

Other objects, advantages, and capabilities of the present invention will become more apparent as the description proceeds.

DETAILED DESCRIPTION OF THE INVENTION

A first embodiment of a low-fat saute is disclosed comprising maltodextrin in the range of about 15 to about 35 percent by weight, fat in the range of about 1 percent to about 15 percent by weight, and water in the range of about 50 to about 80 percent by weight. In addition, a water soluble starch is preferably added in the range of about 1 to about 15 percent by weight (preferably a pregelatinized starch).

A second embodiment is disclosed comprising maltodextrin in the range of about 20 to about 30 percent by weight, fat in the range of about 1 percent to about 6 percent by weight, and water in the range of about 62 to about 72 percent by weight. In addition, a water soluble starch is preferably added in the range of about 1 to about 6 percent by weight (preferably a pregelatinized starch).

In order to make the saute, the ingredients in either the first or second embodiment are mixed together. The following ingredients are preferably mixed in with the above ingredients in either embodiment: whey protein in an amount by weight of up to about 1 percent by weight, xanthum gum in an amount by weight of up to about 1 percent by weight, dried fat in the amount of up to about 0.5 percent by weight, and preservatives in an amount of up to about 1 percent by weight are mixed in with the above ingredients for improved shelf life, taste, texture, and presentation. Fat should be soft so that the ingredients will disperse through the product quickly.

The following ingredients are also preferably mixed in with either embodiment to improve taste, pH, and color: (1) artificial flavoring in the range of up to about 5 percent by weight; (2) food coloring in the range of up to 0.5 percent by weight to enhance butter-like appearance, the food coloring being either beta carotene or FD&C yellow number 5 (beta carotene is added in the preferred embodiment); and (3) a pH adjuster in an amount necessary to adjust the pH of the mixture to 4.5, which is preferred. Salt may also be mixed in with the above ingredients as a preservative and soybean salad oil may be added to assist in the process of manufacture.

One skilled in the art will easily determine that artificial flavoring serves as flavoring means to supply a favorable taste to the particular saute. Other ingredients may serve the same function and therefore fall within the scope of the appended claims, such as flavoring oils. Also, other food coloring agents may be used as food coloring means.

The ingredients are mixed on a higher speed, preferably 109 revolutions per minute, until the fat is completely dispersed. To prevent spillage, certain mixers with a smaller capacity require that the mixture be mixed at a slow speed, preferably about 60 revolutions per minute, for 1 minute, before the mixture is mixed at the higher speed. Cool water is preferred while mixing to prevent lumps. Adding hot water may even be detrimental. Cool water, commonly recognized as tap water from the cold faucet in a cook's kitchen at home or business, is also less expensive to supply than hot water. The mixture should then preferably be allowed to set up overnight and may then be used as a saute.

The following formula is the applicant's most preferred low-fat saute formula:

FORMULA A

| Ingredients | % by Weight |
|---|---|
| Fat | 3.4 |
| Maltodextrin | |
|     Maltodextrin Corn DE 10 | 25 |
|     Maltodextrin Rice DE 10 | 0.6 |
| Pregelatinized Starch | |
|     Stellar 100X | 1 |
|     Instant Clear Gel-Starch | 1.5 |
| Water | 67.3 |
| Dried Butter | 0.26 |
| Vitamin: 1% Beta Carotene | 0.029 |
| Calcium Propionate | 0.1 |
| Sodium Benzoate | 0.1 |
| Whey Protein | 0.1 |
| Xanthum Gum | 0.07 |
| Salt (preservative) | 0.1 |
| Soybean Salad Oil | 0.2 |
| Optional: Citric Acid | (As needed) |
| Butter Flavoring | 0.18 |

When using Formula A, one cup of the saute contains less than about 6.5 grams of fat and less than 312 calories, while one cup of butter contains 176 grams of fat and 1633 calories. Since the saute in Formula A contains less than 0.5 percent fat per tablespoon or serving, the saute is considered non-fat by the Food and Drug Administration.

When the product is manufactured on a large quantity basis, several steps are preferably taken to ensure proper mixing and preservation. After setting the agitators to about 170 RPM, approximately ¼ (most preferably about 25.7 percent) of the total water to be added is added. Calcium Propionate, Sodium Benzoate, and Citric Acid are then added and mixed until the ingredients are in solution. STELLAR 100X, a commercially-produced pregelatinized starch, is added slowly and mixed for five minutes at about 220 RPM. Salt is then added, after which whey, butter flavor, and dehydrated butter are added. The agitation may be increased to 300 RPM, or left at 220 RPM, after which the maltodextrins are added slowly and mixed until the lumps are removed, after which agitators are reduced to 220 RPM, if they were increased. Fat, which is at room temperature, is then added along with xanthum gum, the xanthum gum slurried in soybean salad oil. The beta carotene (previously dissolved in warm water) is then added, after which commercially produced pregelatinized starch INSTA-CLEAR GEL is added and the mixing is continued until the batch is a uniform slurry. The remaining ¾ of the water is then mixed until the batch is uniform and the final mixture is then pumped to a filler at 126 to 130 RPM agitation.

The invention may be embodied in other specific forms without departing from its spirit or essential characteristics. The described embodiments are to be considered in all respects only as illustrative and not restrictive. The scope of the invention, therefore is indicated by the appended claims rather than by the foregoing description. All changes which come within the meaning and range of equivalency of the claims are to be embraced within their scope.

What is claimed is:

1. A low-fat saute comprising:
   (a) maltodextrin in the range of about 15 percent to about 35 percent by weight;
   (b) at least one pregelatinized water soluble starch in the range of about 1 percent to about 15 percent by weight;
   (c) water in the range of about 50 percent to about 80 percent by weight; and,
   (d) fat in the range of about 1 percent to about 15 percent by weight, such that the mixture is substituted in a one-to-one ratio for normal fat sautes, and such that a substantially similar food product is rendered in sauteing, in terms of texture, as if normal fat saute were used.

2. A low-fat saute as in claim 1, wherein the water is cool when the saute is produced.

3. A low-fat saute as in claim 1, wherein the maltodextrin has DE of more than 6, but less than 20.

4. A low-fat saute as in claim 1, wherein the maltodextrin has a DE of 10 or more, but less than 20.

5. A low-fat saute as in claim 1, further comprising:
   (a) dried butter in the range of up to about 0.5 percent by weight; and,
   (b) food coloring in the range of up to about 0.5 percent by weight.

6. A low-fat saute as in claim 1 further comprising at least one food preservative of up to about 1 percent by weight to ensure a longer shelf life.

7. A low-fat saute as in claim 1 further comprising at least one means for enhancing texture, in the range of up to about 2 percent by weight, said means for enhancing texture selected from the group consisting of whey protein and xanthum gum.

8. A low-fat saute as in claim 1, further comprising a means for adjusting the pH of the saute.

9. A low-fat saute as in claim 1, wherein fat is present in the amount of about 3.4 percent or less, qualifying the saute as a non-fat saute.

10. A low-fat saute comprising:
    (a) maltodextrin in the range of about 20 percent to about 30 percent by weight;
    (b) at least one pregelatinized water soluble starch in the range of about 1 percent to about 6 percent by weight;
    (c) water in the range of about 62 percent to about 72 percent by weight; and,
    (d) fat in the range of about 1 percent to about 6 percent by weight, such that the mixture is substituted in a one-to-one ratio for normal fat sautes, and such that a substantially similar food product is rendered in sauteing, in terms of texture, as if normal fat saute were used.

11. A low-fat saute as in claim 10, wherein the water is cool when the saute is produced.

12. A low-fat saute as in claim 10, wherein the maltodextrin has a DE higher than 6 and less than 20.

13. A low-fat saute as in claim 10, wherein the maltodextrin has a DE of 10 or more, but less than 20.

14. A low-fat saute as in claim 10, further comprising:
    (a) dried butter in the range of up to about 0.5 percent by weight; and,
    (b) food coloring in the range of up to about 0.5 percent by weight.

15. A low-fat saute as in claim 10, further comprising at least one food preservative of up to about 1 percent by weight to ensure a longer shelf life.

16. A low-fat saute as in claim 10, further comprising at least one means for enhancing texture, in the range of up to about 2 percent by weight, said means for enhancing texture selected from the group consisting of whey protein and xanthum gum.

17. A low-fat saute as in claim 10, further comprising a means for adjusting the pH of the saute.

18. A method for creating a low-fat saute, comprising mixing together:
(a) maltodextrin in the range of about 15 percent to about 35 percent by weight;
(b) at least one pregelatinized water soluble starch in the amount of about 1 percent to about 15 percent by weight;
(c) water in the amount of about 50 percent to about 80 percent by weight; and,
(d) fat in the range of about 1 to about 15 percent by weight.

19. A method for creating a low-fat saute as in claim 18, wherein:
(a) maltodextrin is in the range of about 20 to about 30 percent by weight;
(b) water is in the range of about 62 percent to about 72 percent by weight;
(c) water soluble starch is in the range of about 1 percent to about 6 percent by weight; and,
(d) fat is in the range of about 1 percent to about 6 percent by weight.

20. A method for creating a low-fat saute as in claim 18, wherein the ingredients in claim 18 are further mixed with:
(a) dried butter in the amount of up to about 0.5 percent by weight;
(b) food coloring in the amount of up to about 0.5 percent by weight;
(c) preservatives in an amount of up to about 1 percent by weight;
(d) whey protein in an amount by weight of up to about 1 percent by weight; and,
(e) xanthum gum in an amount by weight of up to about 1 percent by weight.

21. A method as in claim 18, wherein the water is cool when the saute is mixed.

* * * * *